US012320269B1

(12) United States Patent
Barlam

(10) Patent No.: US 12,320,269 B1
(45) Date of Patent: Jun. 3, 2025

(54) DRAIN SYSTEM FOR PROPULSION SYSTEM

(71) Applicant: Rohr, Inc., Chula Vista, CA (US)

(72) Inventor: Theodore P. Barlam, Poway, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 18/629,552

(22) Filed: Apr. 8, 2024

(51) Int. Cl.
*F01D 25/32* (2006.01)

(52) U.S. Cl.
CPC ........ *F01D 25/32* (2013.01); *F05D 2220/323* (2013.01); *F05D 2240/55* (2013.01); *F05D 2260/602* (2013.01)

(58) Field of Classification Search
CPC . F01D 25/24; F01D 25/32; F01D 9/00; F01D 9/02; F01D 9/04; F01D 9/041; F01D 9/042; F01D 9/06; F05D 2220/323; F05D 2240/55; F05D 2260/602; B64C 1/1453; B64D 29/00
See application file for complete search history.

(56) References Cited

U.S. PATENT DOCUMENTS

| | | | |
|---|---|---|---|
| 10,167,741 B2 | 1/2019 | Lacko | |
| 10,301,973 B2 | 5/2019 | Leon | |
| 10,532,802 B2 | 1/2020 | Sayn-Urpar | |
| 11,549,462 B2 | 1/2023 | Guillemant | |

FOREIGN PATENT DOCUMENTS

| | | | |
|---|---|---|---|
| GB | 2589108 A * | 5/2021 | ............. B64D 27/10 |

* cited by examiner

*Primary Examiner* — Elton K Wong
(74) *Attorney, Agent, or Firm* — Getz Balich LLC

(57) ABSTRACT

A propulsion system includes a gas turbine engine and a nacelle. The nacelle has inner and outer nacelle portions, an upper bifurcation, and a fluid drain system. The inner nacelle portion is disposed radially outside of the gas turbine engine. The outer nacelle portion is disposed radially outside of the inner nacelle portion. An annular bypass duct is disposed between the inner and outer nacelle portions. The upper bifurcation extends through the bypass duct between the inner and outer nacelle portions. The fluid drain system includes a catch tray engaged with a drain mast. The catch tray is disposed radially inside of an inner nacelle wall. The drain mast extends through the bypass duct between the catch tray and a drain mast outer radial end. The outer radial end of the drain mast is engaged with the outer nacelle portion. The drain mast includes first and second fluid passages.

20 Claims, 4 Drawing Sheets

DRAIN SYSTEM FOR PROPULSION SYSTEM

BACKGROUND OF THE DISCLOSURE

1. Technical Field

This disclosure relates generally to an aircraft propulsion system, and more particularly, a fluid drain system for the aircraft propulsion system.

2. Background Information

An aircraft propulsion system may include a gas turbine engine disposed within a nacelle. The nacelle and gas turbine engine are attached to the aircraft by a pylon that is connected to the wing or fuselage of the aircraft. In a turbofan engine configuration, a bypass duct is formed radially outside of the engine core by an inner nacelle portion and an outer nacelle portion. The bypass duct is a generally annular structure that provides a passage for air ("bypass air flow") worked by the fan section of the engine that bypasses the engine core. One or more structural members from the pylon support the engine. The structural members extend through an upper bifurcation that extends radially across the bypass duct between the inner and outer nacelle portions; hence, the term "bifurcation". The upper bifurcation typically extends a substantial axial length (e.g., from just aft of the fan section to the turbine section). The forward end of the upper bifurcation is typically aerodynamically configured. Nevertheless, the upper bifurcation does create some flow losses within the bypass air flow. Some nacelle/engine configurations include only an upper bifurcation disposed within the bypass flow duct. These configurations are referred to as "O-ducts". Other nacelle/engine configurations include both upper and lower bifurcations disposed within the bypass flow duct; e.g., the upper bifurcation disposed at top dead center and the lower bifurcation disposed at bottom dead center. Like the upper bifurcation, the lower bifurcation typically extends a substantial axial length and creates flow losses within the bypass air flow. In some instances, drainage structure is disposed within the lower bifurcation to permit any fluids collecting in the inner nacelle portion to drain therefrom. What is needed is an improved drainage system for the inner nacelle portion.

SUMMARY OF THE DISCLOSURE

According to an aspect of the present disclosure, a propulsion system is provided that includes a gas turbine engine and a nacelle. The gas turbine engine has a center axis. The nacelle has an outer nacelle portion, an inner nacelle portion, an upper bifurcation, and a fluid drain system. The inner nacelle portion has an inner nacelle wall and is disposed radially outside of and surrounds at least a portion of the gas turbine engine. The outer nacelle portion is disposed radially outside of and surrounds at least a portion of the inner nacelle portion. An annular bypass duct is disposed between the inner nacelle portion and the outer nacelle portion. The upper bifurcation extends through the bypass duct between the inner nacelle portion and the outer nacelle portion at a top circumferential position. The fluid drain system includes a catch tray engaged with a drain mast. The catch tray is disposed radially inside of the inner nacelle wall. The drain mast extends through the bypass duct between the catch tray and an outer radial end of the drain mast. The outer radial end of the drain mast is engaged with the outer nacelle portion. The drain mast includes a first fluid passage in fluid communication with the catch tray, and a second fluid passage independent of the first fluid passage.

In any of the aspects or embodiments described above and herein, the drain mast may include an interior wall nested within and spaced apart from an exterior wall, and the first fluid passage may be disposed between the interior wall and the exterior wall.

In any of the aspects or embodiments described above and herein, the interior wall may define an interior cavity of the drain mast, and the fluid drain system may include at least one drain conduit disposed within the interior cavity, and the at least one drain conduit may extend between an inner radial end of the drain mast and the outer radial end of the drain mast.

In any of the aspects or embodiments described above and herein, the propulsion system may include a drain pipe extending from a component disposed inside the inner nacelle portion to the at least one drain conduit.

In any of the aspects or embodiments described above and herein, the first fluid passage may be an annular passage disposed between the interior wall and the exterior wall.

In any of the aspects or embodiments described above and herein, the drain mast may extend through the catch tray, and a first lengthwise segment of the drain mast may extend outwardly from the catch tray to the inner radial end of the drain mast, and a second lengthwise portion of the drain mast may extend outwardly from the catch tray, opposite the first lengthwise segment, from the catch tray to the outer radial end of the drain mast.

In any of the aspects or embodiments described above and herein, the exterior wall of the drain mast may include at least one drain port at an intersection of the first lengthwise segment of the drain mast and the catch tray, and the at least one drain port may provide fluid communication between the catch tray and the first fluid passage.

In any of the aspects or embodiments described above and herein, the catch tray may have a concave configuration with the drain mast disposed at a base of the concave configuration.

In any of the aspects or embodiments described above and herein, the interior wall may define an interior cavity of the drain mast, and the interior cavity may be partitioned to form a plurality of sub-cavities that extend between an inner radial end of the of the drain mast and the outer radial end of the drain mast, and the propulsion system may include a drain pipe extending from a component disposed inside the inner nacelle portion to a sub-cavity.

In any of the aspects or embodiments described above and herein, the drain mast may have a leading edge and a trailing edge, and a first lateral side extending between the leading edge and the trailing edge, and a second lateral side opposite the first lateral side, the second lateral side extending between the leading edge and the trailing edge, and the drain mast may have an elliptical shape with a major axis extending between the leading edge and the trailing edge and a minor axis extending between the first lateral side and the second lateral side, and the major axis of the drain mast may be substantially parallel to a center axis of the gas turbine engine.

In any of the aspects or embodiments described above and herein, the drain mast may have a leading edge and a trailing edge, and a first lateral side extending between the leading edge and the trailing edge, and a second lateral side opposite the first lateral side, the second lateral side extending between the leading edge and the trailing edge, and the drain mast has an airfoil shape with a chord extending between the leading edge and the trailing edge and a thickness extending between the first lateral side and the second lateral side, and the chord of the drain mast is substantially parallel to a center axis of the gas turbine engine.

In any of the aspects or embodiments described above and herein, the catch tray may have a first lateral edge and a second lateral edge, the second lateral edge opposite the first lateral edge, and the catch tray may extend axially between a forward end and an aft end.

In any of the aspects or embodiments described above and herein, the inner nacelle wall may include a pivotally mounted first access door and a pivotally mounted second access door, and the first lateral edge may be disposed adjacent the first access door and the second lateral edge may be disposed adjacent the second access door.

In any of the aspects or embodiments described above and herein, the propulsion system may include a first lateral edge seal engaged with the first lateral edge and the first access door to provide a first fluid seal therebetween, and a second lateral edge door seal engaged with the second lateral edge and the second access door to provide a second seal therebetween.

In any of the aspects or embodiments described above and herein, the catch tray may include a drain panel and a base panel, wherein the drain panel is attached to the base panel at the first lateral edge and at the second lateral edge, and the drain panel and the base panel define a catch tray interior cavity.

In any of the aspects or embodiments described above and herein, the propulsion system may include a first access door seal engaged with the base panel and the first access door to provide a third fluid seal therebetween, and a second access door seal engaged with the base panel and the second access door to provide a fourth fluid seal therebetween.

In any of the aspects or embodiments described above and herein, the outer nacelle portion may include a pivotally mounted first fan cowl door, a pivotally mounted second fan cowl door, and a latch beam, and the outer radial end of the drain mast may be engaged with the latch beam The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
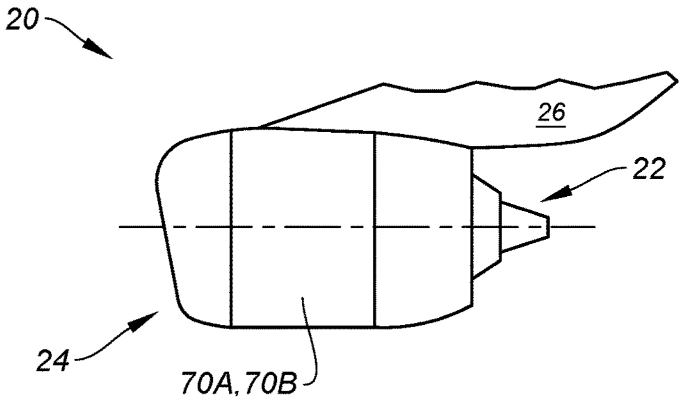
FIG. 1 is a diagrammatic view of an aircraft propulsion system that includes a gas turbine engine disposed within a nacelle.
Figure 2:
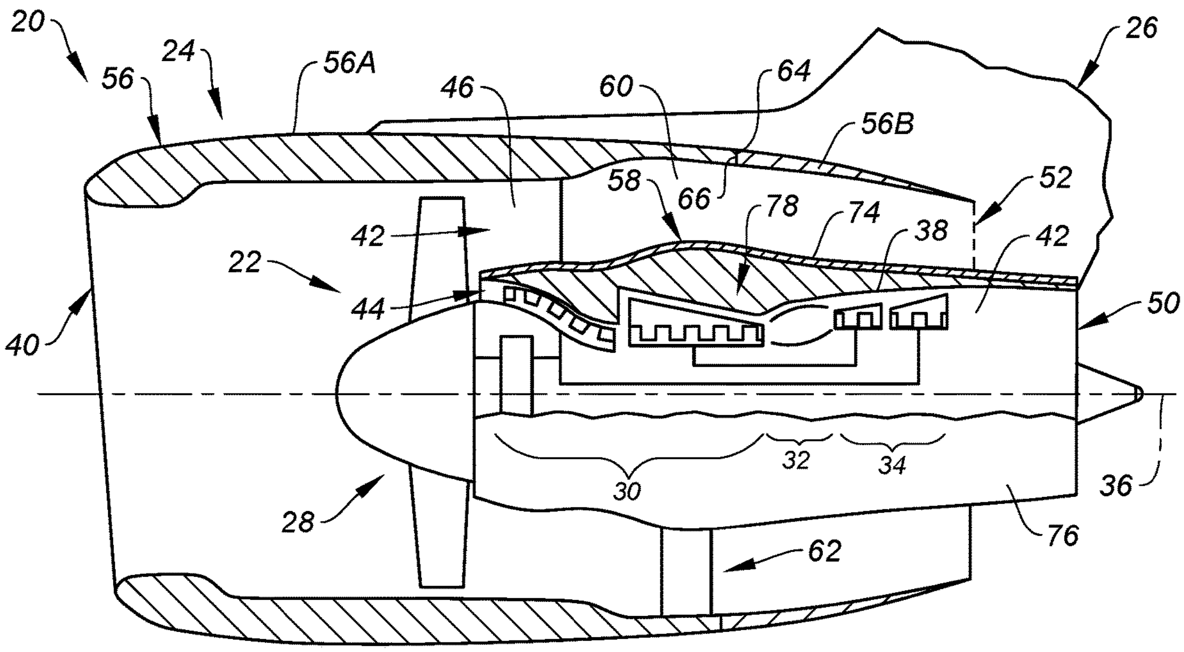
FIG. 2 is a diagrammatic sectioned view of the propulsion system shown in FIG. 1 with a nacelle segment shown in a stowed position.
Figure 3:
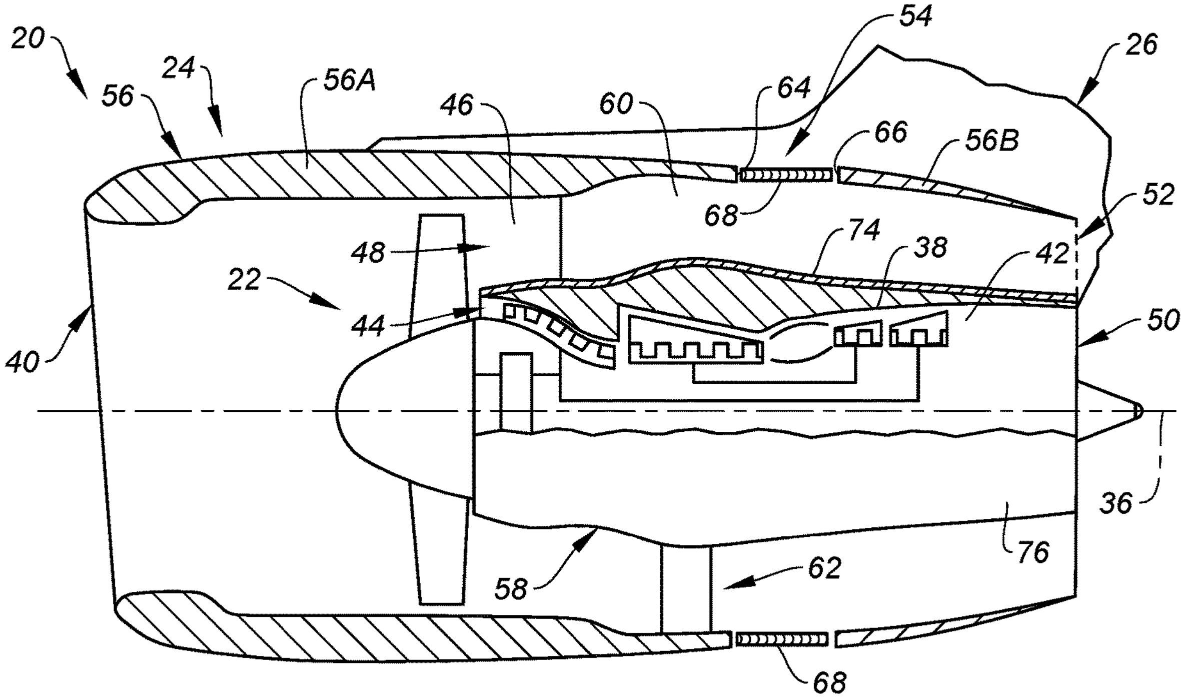
FIG. 3 is a diagrammatic sectioned view of the propulsion system shown in FIG. 1 with a nacelle segment shown in a deployed position.

FIG. 1 diagrammatically illustrates an aircraft propulsion system 20 that includes a gas turbine engine 22 disposed within a nacelle 24 attached to an aircraft (not shown) by a pylon 26. FIGS. 2 and 3 are diagrammatic cutaway illustrations of the aircraft propulsion system 20 shown in FIG. 1.

Referring to FIGS. 2 and 3, the gas turbine engine 22 includes a fan section 28, a compressor section 30, a combustor section 32, and a turbine section 34. The engine sections 28, 30, 32, 34 are arranged sequentially along a center axis 36 of the turbine engine 22. The compressor section 30 includes a low pressure compressor (LPC) section and a high pressure compressor (HPC) section. The turbine section 34 includes a high pressure turbine (HPT) section and a low pressure turbine (LPT) section. The gas turbine engine 22 may include an engine casing 38 disposed radially outside of the compressor, combustor, and turbine sections 30, 32, 34. The engine casing 38 may be a unitary structure, or may comprise a plurality of structure components that collectively form the engine casing 38.

During operation, air enters the turbine engine 20 through a forward engine inlet 40. The air is directed through the fan section 28 and into a core flow path 42 through a forward core inlet 44 and into a bypass duct 46 through a bypass duct inlet 48. The air within the core flow path 42 may be referred to as "core air". The air within the bypass duct 46 may be referred to as "bypass air". The core air is directed through the engine sections 30, 32, 34 and exits the gas turbine engine 22 through an aft core exhaust 50 to provide forward engine thrust. Within the combustor section 32, fuel is mixed with the core air and ignited to power the gas turbine engine 22. The bypass air is directed through the bypass duct 46 and may exit the gas turbine engine 22 through an aft bypass duct exhaust 52 to provide additional forward engine thrust. Under certain operating conditions, a portion of the bypass air may exit the turbine engine 22 through a thrust reverser 54 (e.g., see FIG. 2) to provide reverse engine thrust.

Referring to FIGS. 1-3, the nacelle 24 includes an outer nacelle portion 56, an inner nacelle portion 58, an upper bifurcation 60, and a fluid drain system 62.

The outer nacelle portion 56 extends axially between the engine inlet 40 and the bypass duct exhaust 52. The outer nacelle portion 56 extends circumferentially around and encloses substantially all of the gas turbine engine 22. In the exemplary embodiment shown in FIGS. 1 and 2, the outer nacelle portion 56 includes a fixed forward segment 56A and a movable aft segment 56B (e.g., translating sleeve 56B). The fixed forward segment 56A and the translating sleeve 56B each have a generally tubular geometry. The fixed forward segment 56A extends axially from the engine inlet 40 to an aft end 64. The translating sleeve 56B extends axially from a forward end 66 to the bypass duct exhaust 52.

The translating sleeve 56B is adapted to move axially between a stowed position (see FIG. 1) and a deployed position (see FIG. 2) as part of a thrust reverser 54. In the deployed position, bypass air flow is directed through one or more cascades 68 to reverse the direction of the airflow and produce reverse thrust. The outer nacelle portion 56 may include fan cowl doors 70A, 70B (see FIGS. 1 and 4) that are pivotally mounted adjacent the pylon 26 to permit the fan cowl doors 70A, 70B to be rotated from a closed position (as shown in FIG. 1) to an open position for access to the inner nacelle portion 58 and the gas turbine engine 22. In some embodiments, the outer nacelle portion 56 may include one or more latch beams 72 (e.g., see FIGS. 4 and 9) disposed to engage with the distal ends of the fan cowl doors 70A, 70B when the fan cowl doors 70A, 70B are disposed in the closed position.

Figure 4:
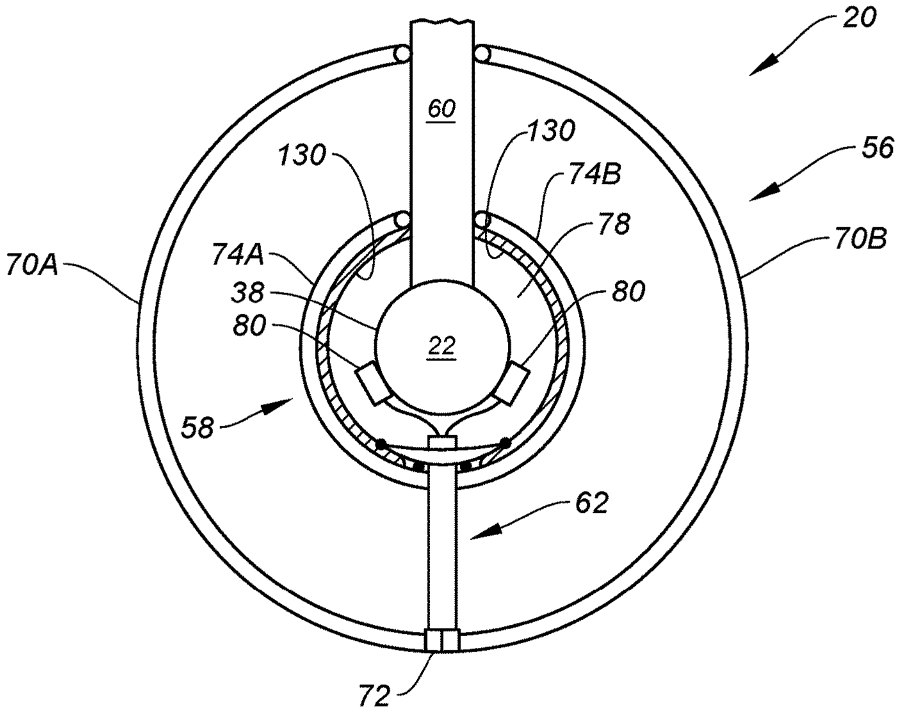
FIG. 4 is a diagrammatic view of a present disclosure propulsion system.

The inner nacelle portion 58 (sometimes referred to as an "inner fixed structure" or "IFS") includes a generally tubular inner nacelle wall 74 having an outer surface 76 that defines the inner radial boundary portion of the bypass duct 46. The inner nacelle portion 58 may extend axially along the center axis 36 between the inlets 44, 48 and the core exhaust 50. The inner nacelle portion 58 extends circumferentially around and encloses the compressor, combustor, and turbine sections 30, 32, 34; which sections may be referred to as the engine core. The inner nacelle portion 58 may be radially spaced apart from the engine casing 38, thereby forming an annular region 78 therebetween. As will be detailed herein, it is common for peripheral devices and engine components (e.g., control units, APUs, piping, valving, pumps, and the like) to be disposed in the annular region 78 disposed between the inner nacelle wall 74 and the engine casing 38. FIG. 4 diagrammatically illustrates a pair of peripheral devices/engine components 80 disposed in the annular region 78. A forward portion of the inner nacelle portion 58 is axially aligned with and arranged radially within an aft portion of the outer nacelle portion 56, thereby forming the bypass duct 52 as well as its inlet 48 and exhaust 52 radially between the inner and outer nacelle portions 58, 56. As will be detailed herein, in some applications the inner nacelle wall 74 may include access doors 74A, 74B that permit a technician to access the engine 22 after the access door 74A, 74B is opened.

The upper bifurcation 60 extends radially between the outer nacelle portion 56 and the inner nacelle portion 58. In this configuration, the outer nacelle portion 56, the inner nacelle portion 58, and the upper bifurcation 60 may be described as forming an "O-duct" that defines the bypass duct 46; e.g., see FIG. 3. The term "O-duct" refers to the configuration of the bypass duct 46 wherein the upper bifurcation 60 is disposed at a top dead center position (e.g., at the "12 o'clock" position), extending between the outer and inner nacelle portions 56, 58 thereby splitting the bypass duct 46 into two separate portions. The circumferential position of the upper bifurcation 60 may also be referred to as a "top" circumferential position as a function of a gravitational vector.

Figure 5:
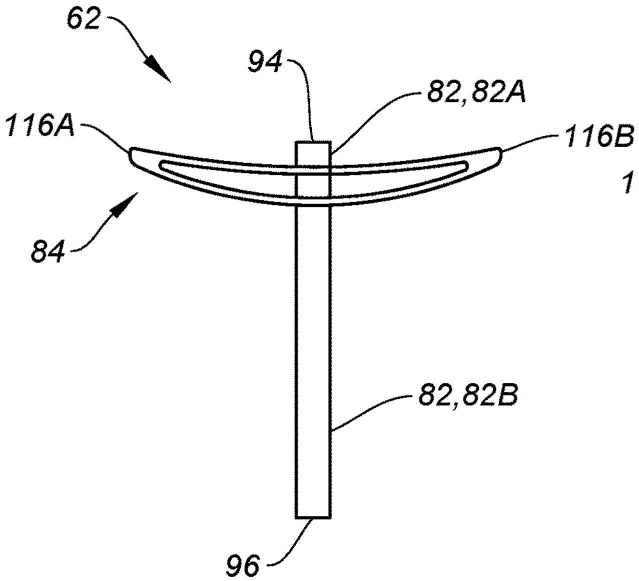
FIG. 5 is a diagrammatic view of a present disclosure fluid drain system embodiment.
Figure 5A:
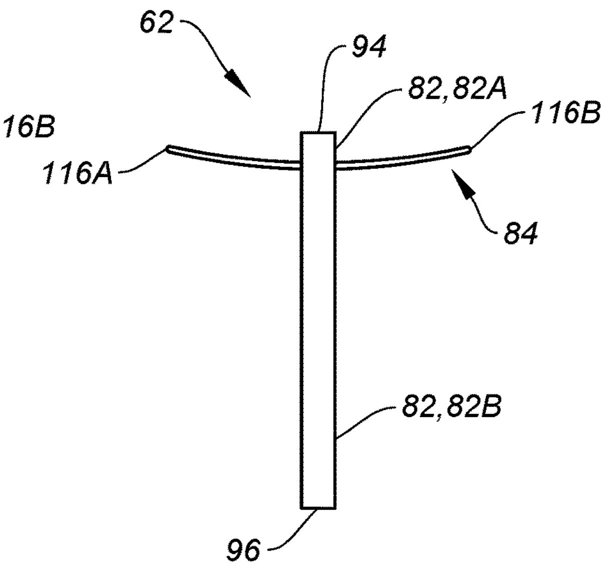
FIG. 5A is a diagrammatic view of a present disclosure fluid drain system embodiment.
Figure 6:
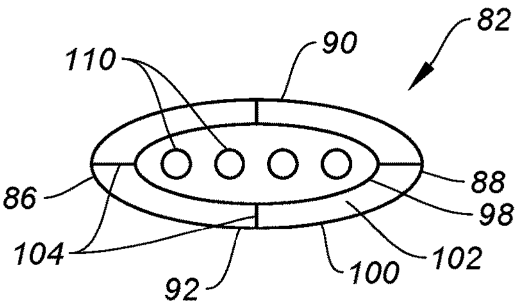
FIG. 6 is a diagrammatic cut view of a drain mast embodiment.
Figure 6A:
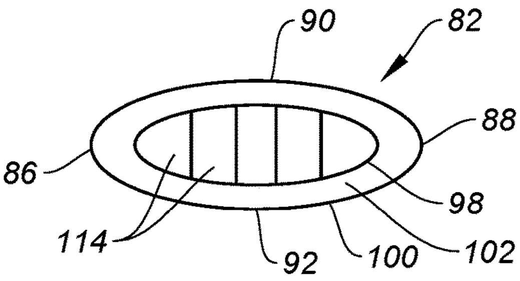
FIG. 6A is a diagrammatic cut view of a drain mast embodiment.

Referring to FIGS. 4, 5, and 5A, the present disclosure fluid drain system 62 is configured to provide fluid drain passages from the inner nacelle portion 58 to the exterior of the nacelle 24; i.e., outside of the outer nacelle portion 56. The fluid drain system 62 includes a drain mast 82 and a catch tray 84. The fluid drain system 62 is disposed at a bottom top dead center position (e.g., at the "6 o'clock" position) of the nacelle 24. The circumferential position of the fluid drain system 62 may also be referred to as a "bottom" circumferential position as a function of a gravitational vector. The drain mast 82 may be described as having a leading edge 86, a trailing edge 88, a first lateral side 90, and a second lateral side 92. The drain mast 82 extends lengthwise from an inner radial end 94 to an outer radial end 96. The first and second lateral sides 90, 92 may extend lengthwise between the inner and outer radial ends 94, 96, and chordwise between the leading and trailing edges 86, 88. The drain mast 82 includes an interior wall 98 and an exterior wall 100. The interior wall 98 is nested within and spaced apart from the exterior wall 100, thereby forming an annular passage 102 disposed between the interior and exterior walls 98, 100. In the example drain masts 82 shown in FIGS. 6, 6A, and 7, the interior wall 98 is shown having the same geometric cross-sectional configuration as the exterior wall 100 (e.g., both having an elliptical or airfoil shape) but that is not required. A drain mast 82 having an elliptical cross-sectional configuration may be described as having a major axis extending between the leading and trailing edges 86, 88, and a minor axis extending between the first and second lateral sides 90, 92. The major axis may be axially aligned with the airflow direction through the bypass duct 46; e.g., parallel to the engine center axis 36 or within plus or minus ten degrees of the center axis 36. A drain mast 82 having an airfoil cross-sectional configuration may be described as having a chord extending between the leading and trailing edges 86, 88, and a thickness extending between the first and second lateral sides 90, 92. The chord may be axially aligned with the airflow direction through the bypass duct 46; e.g., parallel to the engine center axis 36 or within plus or minus ten degrees of the center axis 36. In some embodiments, the annular passage 102 may have a constant cross-sectional geometry between the inner and outer radial ends 94, 96 but that is not required. In some embodiments, support flanges 104 (e.g., pins, panels, or the like) may extend within the annular passage 102 between the interior and exterior walls 98, 100; e.g., see FIG. 6A. As will be detailed herein, the exterior wall 100 includes one or more drain ports 106 (e.g., see FIG. 7) that provide fluid communication between the exterior of the drain mast 82 and the annular passage 102 between the interior and exterior walls 98, 100.

In some embodiments, the interior wall 98 may define a drain mast interior cavity 108 that extends between the inner and outer radial ends 94, 96. The interior and exterior walls 98, 100 may be configured such that there is no fluid communication between the drain mast interior cavity 108 and the annular passage 102 disposed between the interior and exterior walls 98, 100; e.g., fluid passing within the annular passage 102 cannot enter the interior cavity 108, and vice versa. As will be detailed herein, in some embodiments the interior cavity 108 may be configured to receive one or more drain conduits 110 (e.g., see FIGS. 6 and 7), with each respective drain conduit 110 in fluid communication with a drain piping 112 (i.e., a fluid conduit) that extends from an engine component to that respective drain conduit 110. The drain conduits 110 may be independent structures (e.g., tubes) that are disposed within the interior cavity 108 and may be attached to the drain mast 82; e.g., attached to the interior wall 98 or to an end cap (not shown) disposed at the inner radial end 94, and or an end cap disposed at the outer radial end 96, or end caps at both ends. Alternatively, the interior cavity 108 may be partitioned to form one or more drain sub-cavities 114 that extend between the inner and outer radial ends 94, 96; e.g., see FIG. 6A. In those embodiments that include drain sub-cavities 114, each sub-cavity 114 may be in fluid communication with a drain piping 112 that extends from a peripheral device or engine component 80 to that respective sub-cavity 114.

Referring to FIGS. 4, 5, 5A, and 7, the catch tray 84 includes a drain panel 116 that extends between a first lateral edge 116A and a second lateral edge 116B and extends axially between a forward end 116C and an aft end 116D; e.g., extends axially in a direction that is parallel to the gas turbine engine 22/nacelle center axis 36. The catch tray 84 is configured to receive the drain mast 82 in a central region of the drain panel 116. In some embodiments, the catch tray 84 and the drain mast 82 may be independent structures engaged with one another (e.g., attached to one another) and in other embodiments, the catch tray 84 and the drain mast 82 may be a unitary structure. As can be seen in FIGS. 4, 5, 5A, and 8, the drain mast 82 extends through the catch tray 84 such that the length of the drain mast 82 is substantially perpendicular to the catch tray 84. A first lengthwise segment of the drain mast 82 (i.e., the "upper drain mast segment 82A") extends outwardly from the catch tray 84 on a first side of the catch tray 84 and a second lengthwise portion of the drain mast 82 (i.e., the "lower drain mast segment 82B") extends outwardly from the catch tray 84 on a second side of the catch tray 84, opposite the first side.

Figure 7:
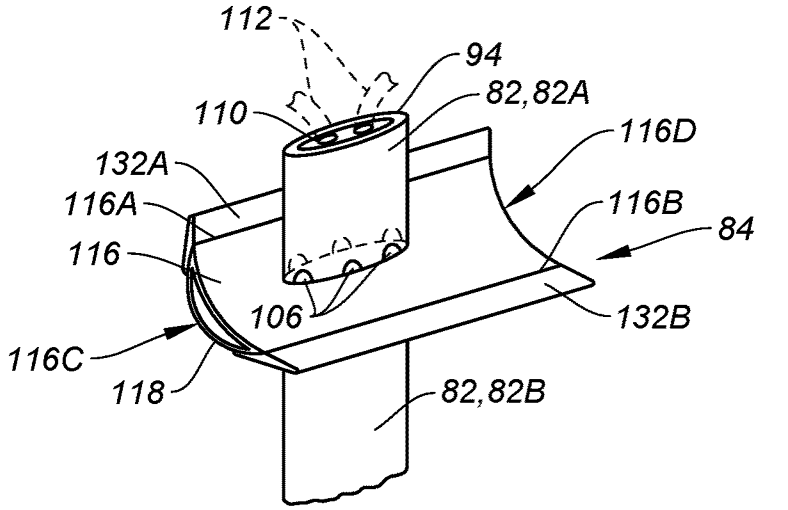
FIG. 7 is a diagrammatic perspective partial view of a present disclosure fluid drain system embodiment.
Figure 8:
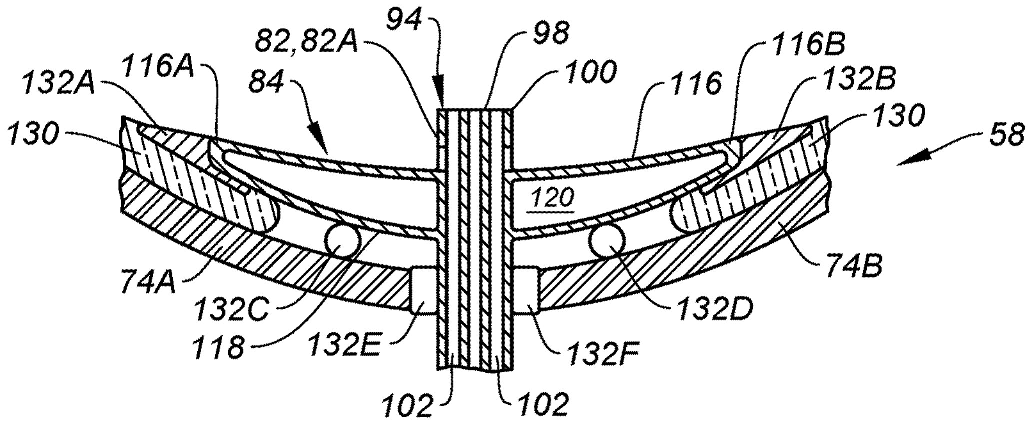
FIG. 8 is a diagrammatic partial cut view of a present disclosure fluid drain system embodiment.

The catch tray 84 embodiment diagrammatically shown in FIGS. 5, 7, and 8 has a drain panel 116, a base panel 118, and a catch tray interior cavity 120. The drain mast 82 extends through the catch tray 84 with the upper drain mast segment 82A extending outwardly from the drain panel 116 and the lower drain mast segment 82B extending outwardly from the base panel 118. The catch tray 84 embodiment diagrammatically shown in FIG. 5A is a single solid panel and may be referred to as a "drain panel 116". In both of these embodiments, the drain panel 116 has a concave configuration (e.g., an arcuate shape, or an angled configuration) with the drain mast 82 disposed at the base of the concave configuration to facilitate gravitational flow of fluids towards the drain mast 82. The catch tray 84 embodiments shown in FIGS. 5, 5A, 7, and 8 are examples of acceptable catch tray 84 configurations and the present disclosure is not limited to these examples.

The drain mast outer radial end 96 is configured with the outer nacelle portion 56 to permit fluids to pass through the drain mast 82 and thereafter outside of the nacelle 24. A non-limiting example of how the drain mast 82 may be configured for engagement with the outer nacelle portion 56 is diagrammatically shown in FIG. 9. In this example, the portion of the drain mast 82 adjacent the outer radial end 96 of the drain mast 82 is configured to be disposed between a segment of each fan cowl door 70A, 70B when the fan cowl doors 70A, 70B are disposed in a closed configuration; e.g., engaged with a latch beam 72 portion of the outer nacelle portion 56. The present disclosure is not limited to the drain mast 82 outer radial end 96 and outer nacelle portion 56 example configuration shown in FIG. 9.

In some embodiments of the present disclosure, the fluid drain system 62 may include, or may be configured in engage with, seals that mitigate the potential for fluid leakage out of the inner nacelle portion 58. FIGS. 4 and 8 diagrammatically illustrate an example of a present disclosure fluid drain system 62 that includes seals to mitigate fluid leakage out of the inner nacelle portion 58. The sectional view shown in FIG. 4 diagrammatically illustrates an aircraft propulsion system 20 that includes a gas turbine engine 22 core disposed within a nacelle 24. The inner nacelle portion 58 includes a pair of pivotably mounted first and second access doors 74A, 74B and the outer nacelle portion 56 includes a pair of pivotably mounted first and second fan cowl doors 70A, 70B. In FIG. 4, the access doors 74A, 74B and the fan cowl doors 70A, 70B are both shown in a closed configuration. FIGS. 4 and 8 also diagrammatically illustrate a thermal blanket 130 disposed on the inner portion of each inner nacelle portion access door 74A, 74B. The present disclosure does not require the inclusion of a thermal blanket 130. The catch tray 84 embodiment shown in FIG. 8 includes a first lateral edge seal 132A, a second lateral edge seal 132B, a first access door seal 132C, and a second access door seal 132D. The embodiment shown in FIG. 8 also includes a first access door distal end seal 132E and a second access door distal end seal 132F. In the closed configuration, the first and second lateral edge seals 132A, 132B are configured to engage with the respective thermal blanket 132 portion. In the catch tray 84 embodiment shown in FIG. 8, the first access door seal 132C is disposed for engagement with the base panel 118 of the catch tray 84 and the inner nacelle portion first access door 74A, and the second access door seal 132D is disposed for engagement with the base panel 118 of the catch tray 84 and the inner nacelle portion 58 second access door 74B. The first and second access door distal end seals 132E, 132F are configured for sealing engagement with the drain mast 82. The sealing arrangement diagrammatically shown in FIG. 8 is an example of an acceptable sealing arrangement and the present disclosure is not limited thereto.

Figure 9:
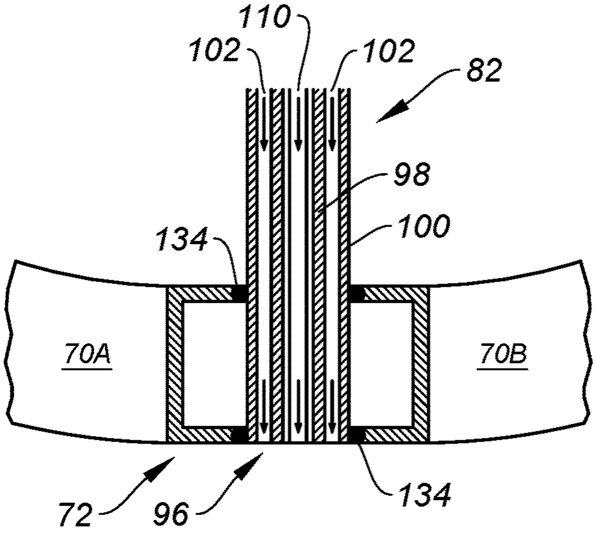
FIG. 9 is a diagrammatic partial view of a present disclosure fluid drain system embodiment.

In some embodiments of the present disclosure, the fluid drain system 62 may include, or may be configured in engage with, seals that mitigate the potential for fluid leakage out of the outer nacelle portion 56. FIG. 9 diagrammatically illustrates an example of a present disclosure fluid drain system 62 that includes seals to mitigate fluid leakage out of the outer nacelle portion 56. For example, the fluid drain system 62 may include a plurality of seals 134 that provide sealing engagement between the drain mast 82 and the latch beam 72 portion of the outer nacelle portion 56. The scaling arrangement diagrammatically shown in FIG. 9 is an example of an acceptable sealing arrangement and the present disclosure is not limited thereto.

During operation of the propulsion system, certain peripheral devices engaged with the gas turbine engine 22 and/or engine components (collectively noted by reference number 80 in FIG. 4) may include drain piping 112 (i.e., a fluid conduit) that extends from the respective peripheral device/engine component 80 to the drain mast 82. The respective peripheral device/engine component 80 and drain piping 112 may be configured as a fluid release mechanism to alleviate an excess fluid condition and/or to provide ventilation for the peripheral device/engine component 80. In those embodiments wherein the drain mast 82 includes drain conduits 110, the drain piping 112 from each respective peripheral device/engine component 80 is in fluid communication with a respective drain mast drain conduit 110. In those embodiments wherein the interior cavity 108 is partitioned to form drain sub-cavities 114, the drain piping 112 from each respective peripheral device/engine component 80 is in fluid communication with a respective drain sub-cavity 114. In any of these embodiments, the present disclosure provides a fluid drainage and/or ventilation mechanism for the respective peripheral device/engine component 80.

The present disclosure fluid drain system 62 also recognizes the potential for unintended fluid leakage that may occur in the various fluid piping systems and/or occur at various different sealed fluid connections. In the event fluid leakage occurs within the inner nacelle portion 58, the catch tray 84 of the present disclosure fluid drain system 62 is disposed at the gravitational bottom of the inner nacelle portion 58 and is therefore disposed to collect leaked fluids. As stated above, the upper drain mast segment 82A extends outwardly from the catch tray 84 on the first side (i.e., the gravitational upper side) of the catch tray 84 and one or more drain ports 106 are disposed in the drain mast exterior wall 100 at the intersection of the drain mast exterior wall 100 and the drain panel 116 of the catch tray 84. The drain ports 106 are disposed to permit passage of fluids collected by the catch tray 84 into the annular passage 102 between the interior and outer exterior walls 98, 100 of the drain mast 82. In those embodiments wherein the drain panel 116 has a concave configuration, the concave configuration will gravitationally facilitate the flow of fluids collected by the catch tray 84 into the annular passage 102 between the interior and exterior walls 98, 100 of the drain mast 82. The drain ports 106 and the annular passage 102 also provide a ventilation path for the inner nacelle portion 58.

Fluids (i.e., liquids or gas) passing through a drain mast drain conduit 110 and/or entering the annular passage 102 between the interior and exterior walls 98, 100 of the drain mast 82 may exit the outer radial end 96 of the drain mast 82, and therefore exit the nacelle 24. In some embodiments, the present disclosure fluid drain system 62 may include a fluid reservoir (not shown) in fluid communication with the outer radial end 96 of the drain mast 82 for storing fluids passing through a drain mast drain conduit 110 and/or the annular passage 102 between the interior and exterior walls 98, 100 of the drain mast 82.

As is diagrammatically shown in FIGS. 1 and 2, the present disclosure fluid drain system 62 provides an effective drain system for the inner nacelle portion 58 of a propulsion system 20 that can be utilized with a bypass duct 46 configured as an O-duct. The drain mast 82 extending through the bypass duct 46 is an aerodynamic body that presents minimal flow losses relative to those produced by a lower bifurcation as may be used in a D-duct or C-duct nacelle bypass duct 46 configuration. The axial length and the width of the drain mast 82 need only be as large as is required to include an interior cavity 108 configured to receive a desired number of drain conduits 110 (or drain sub-cavities) and the annular passage 102 between the interior and exterior walls 98, 100. Hence, the geometric configuration of the drain mast 82 is a fraction of that typically associated with a lower bifurcation.

The terms "forward", "leading", "aft, "trailing", "left", "right", "upper", "lower", etc., are used herein to indicate the relative position of a component or surface. As core gas air passes through the engine, a "leading edge" of a stator vane or rotor blade encounters core gas air before the "trailing edge" of the same. In an engine like that shown in FIGS. 1 and 2, the fan assembly is "forward" of the compressor assembly and the turbine assembly is "aft" of the compressor assembly. The terms "upstream" and "downstream" used herein refer to the direction of an air/gas flow passing through an annular gas path of the turbine engine. It should also be noted that the terms "radial" and "circumferential" are used herein with respect to a central axis of the turbine engine.

The terms "substantially", "generally" and/or "about" as contemplated herein are used with the appreciation that small variations in dimensions or numeric values are within the present disclosure. Such small variations can include variations due to manufacturing tolerances and/or expansion/contraction and or wear of parts subjected to varying conditions (e.g., pressure, force, temperature, etc.).

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details. It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

What is claimed is:

1. A propulsion system, comprising:

a gas turbine engine having a center axis; and a nacelle having an outer nacelle portion, an inner nacelle portion, an upper bifurcation, and a fluid drain system;

wherein the inner nacelle portion has an inner nacelle wall and is disposed radially outside of and surrounds at least a portion of the gas turbine engine, and the outer nacelle portion is disposed radially outside of and surrounds at least a portion of the inner nacelle portion, wherein an annular bypass duct is disposed between the inner nacelle portion and the outer nacelle portion; and wherein the upper bifurcation extends through the bypass duct between the inner nacelle portion and the outer nacelle portion at a top circumferential position; and wherein the fluid drain system includes a catch tray engaged with a drain mast, the catch tray disposed radially inside of the inner nacelle wall, wherein the drain mast extends through the bypass duct between the catch tray and an outer radial end of the drain mast, and the outer radial end of the drain mast is engaged with the outer nacelle portion, wherein the drain mast includes a first fluid passage in fluid communication with the catch tray, and a second fluid passage independent of the first fluid passage.

2. The propulsion system of claim 1, wherein the drain mast includes an interior wall nested within and spaced apart from an exterior wall, and the first fluid passage is disposed between the interior wall and the exterior wall.

3. The propulsion system of claim 2, wherein the interior wall defines an interior cavity of the drain mast, and the fluid drain system includes at least one drain conduit disposed within the interior cavity, the at least one drain conduit extending between an inner radial end of the drain mast and the outer radial end of the drain mast.

4. The propulsion system of claim 3, further comprising a drain pipe extending from a component disposed inside the inner nacelle portion to the at least one drain conduit.

5. The propulsion system of claim 3, wherein the first fluid passage is an annular passage disposed between the interior wall and the exterior wall.

6. The propulsion system of claim 3, wherein the drain mast extends through the catch tray, and a first lengthwise segment of the drain mast extends outwardly from the catch tray to the inner radial end of the drain mast, and a second lengthwise portion of the drain mast extends outwardly from the catch tray, opposite the first lengthwise segment, from the catch tray to the outer radial end of the drain mast.

7. The propulsion system of claim 6, wherein the exterior wall of the drain mast includes at least one drain port at an intersection of the first lengthwise segment of the drain mast and the catch tray, wherein the at least one drain port provides fluid communication between the catch tray and the first fluid passage.

8. The propulsion system of claim 7, wherein the catch tray has a concave configuration with the drain mast disposed at a base of the concave configuration.

9. The propulsion system of claim 2, wherein the interior wall defines an interior cavity of the drain mast, and the interior cavity is partitioned to form a plurality of sub-cavities that extend between an inner radial end of the of the drain mast and the outer radial end of the drain mast.

10. The propulsion system of claim 9, further comprising a drain pipe extending from a component disposed inside the inner nacelle portion to a said sub-cavity of the plurality of sub-cavities.

11. The propulsion system of claim 1, wherein the drain mast has a leading edge and a trailing edge, and a first lateral side extending between the leading edge and the trailing edge and a second lateral side opposite the first lateral side, the second lateral side extending between the leading edge and the trailing edge, and the drain mast has an elliptical shape with a major axis extending between the leading edge and the trailing edge and a minor axis extending between the first lateral side and the second lateral side.

12. The propulsion system of claim 11, wherein the major axis of the drain mast is substantially parallel to the center axis of the gas turbine engine.

13. The propulsion system of claim 1, wherein the drain mast has a leading edge and a trailing edge, and a first lateral side extending between the leading edge and the trailing edge and a second lateral side opposite the first lateral side, the second lateral side extending between the leading edge and the trailing edge, and the drain mast has an airfoil shape with a chord extending between the leading edge and the trailing edge and a thickness extending between the first lateral side and the second lateral side.

14. The propulsion system of claim 13, wherein the chord of the drain mast is substantially parallel to the center axis of the gas turbine engine.

15. The propulsion system of claim 1, wherein the catch tray has a first lateral edge and a second lateral edge, the second lateral edge opposite the first lateral edge, and the catch tray extends axially between a forward end and an aft end.

16. The propulsion system of claim 15, wherein the inner nacelle wall includes a pivotally mounted first access door and a pivotally mounted second access door, and the first lateral edge is disposed adjacent the first access door and the second lateral edge is disposed adjacent the second access door.

17. The propulsion system of claim 16, further comprising a first lateral edge seal engaged with the first lateral edge and the first access door to provide a first fluid seal therebetween, and a second lateral edge door seal engaged with the second lateral edge and the second access door to provide a second seal therebetween.

18. The propulsion system of claim 17, wherein the catch tray includes a drain panel and a base panel, wherein the drain panel is attached to the base panel at the first lateral edge and at the second lateral edge, and the drain panel and the base panel define a catch tray interior cavity.

19. The propulsion system of claim 18, further comprising a first access door seal engaged with the base panel and the first access door to provide a third fluid seal therebetween, and a second access door seal engaged with the base panel and the second access door to provide a fourth fluid seal therebetween.

20. The propulsion system of claim 1, wherein the outer nacelle portion includes a pivotally mounted first fan cowl door, a pivotally mounted first second fan cowl door, and a latch beam, and the outer radial end of the drain mast is engaged with the latch beam.

* * * * *